(12) United States Patent
Inufusa

(10) Patent No.: US 7,886,697 B2
(45) Date of Patent: Feb. 15, 2011

(54) OPTIMIZED ORAL GLUCOSE TOLERANCE TEST

(75) Inventor: Haruhiko Inufusa, Osaka (JP)

(73) Assignee: TIMA Foundation, Balzers (LI)

( * ) Notice: Subject to any disclaimer, the term of this patent is extended or adjusted under 35 U.S.C. 154(b) by 684 days.

(21) Appl. No.: 11/951,788

(22) Filed: Dec. 6, 2007

(65) Prior Publication Data

US 2009/0145366 A1    Jun. 11, 2009

(51) Int. Cl.
*A01K 1/03* (2006.01)

(52) U.S. Cl. ........................... 119/417; 119/651

(58) Field of Classification Search ............. 119/416, 119/417, 420, 650, 651, 174; 604/66, 504; 435/4, 14; 600/300; 128/897, 898
See application file for complete search history.

(56) References Cited

U.S. PATENT DOCUMENTS

| | | | | |
|---|---|---|---|---|
| 3,543,724 A * | 12/1970 | Kirkpatrick et al. | ......... | 119/702 |
| 3,897,751 A * | 8/1975 | Gullino et al. | ............. | 119/420 |
| 4,756,707 A * | 7/1988 | MacLeod et al. | ............ | 604/261 |
| 5,247,901 A * | 9/1993 | Landon et al. | .............. | 119/419 |
| 5,823,140 A * | 10/1998 | Pittet et al. | .................... | 119/174 |
| 5,888,756 A * | 3/1999 | Ralston | ....................... | 435/14 |
| 6,062,224 A * | 5/2000 | Kissinger et al. | ............ | 128/897 |
| 6,160,022 A * | 12/2000 | Bergeron, Jr. | ............... | 514/674 |
| 6,528,486 B1 * | 3/2003 | Larsen et al. | .................. | 514/12 |
| 6,644,244 B2 * | 11/2003 | Mauderli et al. | ............ | 119/417 |
| 6,935,272 B2 * | 8/2005 | Balto | .......................... | 119/417 |
| 7,629,349 B2 * | 12/2009 | Gillespie et al. | ......... | 514/262.1 |
| 7,713,946 B2 * | 5/2010 | Dhalla et al. | .................. | 514/46 |
| 2003/0150395 A1 * | 8/2003 | Mauderli et al. | ............ | 119/417 |
| 2005/0051179 A1 * | 3/2005 | Foong et al. | ................. | 128/897 |
| 2007/0185051 A1 * | 8/2007 | Dhalla et al. | .................. | 514/47 |
| 2007/0272166 A1 * | 11/2007 | Kanno | ........................ | 119/420 |

* cited by examiner

*Primary Examiner*—T. Nguyen
(74) *Attorney, Agent, or Firm*—Wilmer Cutler Pickering Hale and Dorr LLP

(57) ABSTRACT

Described herein is a method of enhancing the reliability and reproducibility of animal experiments. As described herein, the method relates to an improved oral glucose tolerance test (OGTT) in animals, wherein the set up of the test has been optimized in comparison to the standard procedure for OGTT.

23 Claims, No Drawings

OPTIMIZED ORAL GLUCOSE TOLERANCE TEST

FIELD OF THE INVENTION

The field of the invention relates generally to research methods and research tools.

BACKGROUND

A glucose tolerance test is a medical procedure in which glucose is administered to a subject, e.g., an animal, to determine how quickly the glucose is cleared from the blood of the subject. The glucose is typically given orally so that the common test is typically called an oral glucose tolerance test (OGTT). This test is frequently used to evaluate the status of metabolic pathways in a human or animal body. From the results of the test, metabolic disorders can be diagnosed or the impact of drugs on physiology can be determined.

To evaluate the effects of drugs on metabolism or their impact on metabolic diseases such as diabetes mellitus, the standard approach is to use mice or rats for the necessary in vivo experiments. However, the metabolism of mice and rats does not reflect all aspects of the human metabolic system. A drug that is very effective in mice and rats might not have any impact on humans. Conversely, a drug that is ineffective in mice and rats might be very effective on humans. Therefore, factors that may influence metabolism and lead to erroneous experimental results must be controlled or mitigated. Moreover, although the standard approach is to use mice and rats, anthropoid apes such as Cynomolgus monkeys are generally considered to be among the animals that best reflect the human metabolic system due to their gene homology to humans exceeding 95%.

Animals including mice, rats and monkeys are very sensitive to artificial stimulations and environmental influences. As a consequence, it is often difficult to obtain stable and reproducible data from an animal experiment if the experiment is conducted with irritated or even frightened animals. This is true for an oral glucose tolerance test. For example, blood glucose levels of mice, rats and monkeys rise immediately if they are merely touched by a human. If these animals feel real pain, for instance in the course of blood sampling, results show an even more dramatic increase in blood glucose levels.

Thus, it is laborious and complicated to achieve results which are reliable, reproducible and significant when conducting an animal experiment, particularly an OGTT, with animals such as mice, rats and monkeys.

Therefore, it is the object of the present invention to provide a method for improving the accuracy of the results obtained from an animal experiment.

BRIEF SUMMARY OF THE INVENTION

Described herein is a method of enhancing the reliability and reproducibility of animal experiments. As described herein, the method relates to an improved oral glucose tolerance test (OGTT) for animals, wherein the set up of the test has been optimized in comparison to the standard procedure for OGTT.

DEFINITIONS

The term "animal" as used herein includes, without limitation, a mouse, rat, guinea pig, dog, cat, horse, cow, pig, monkey, chimpanzee, or baboon. In one embodiment, the animal is a mammal. In another embodiment, the animal is a vertebrate.

The term "stress factor" as used herein refers to any agent in an animal's blood that can result in or can be influenced by an animal being irritated, aggressive, agitated, frightened, exhausted, losing weight, or otherwise stressed. For illustration, blood glucose is an example of a stress factor.

The term "stress" is used herein as a person of skill in the art would understand it. Stress generally refers to a disruption in an animal or human's biological, psychological, physiological, mental, or social system. For example, an animal or human can be stressed when irritated, aggressive, agitated, frightened, exhausted, or losing weight. As a person of skill in the art will understand, stress can lead to numerous biological, psychological, physiological, mental, or social reactions in the human or animal.

DESCRIPTION OF THE INVENTION

Described herein is a method of enhancing the reliability and reproducibility of animal experiments. As described herein, the method relates to an improved oral glucose tolerance test (OGTT) for animals, wherein the set up of the test has been optimized in comparison to the standard procedure for OGTT.

In one aspect, the method described herein relates to enhancing the accuracy, reliability and reproducibility of an animal experiment, wherein the method comprises the following steps:
   a.) acclimatizing an animal by exposing the animal to the environment of the experiment, the medical or veterinary staff of the experiment, or the settings of the experiment;
   b.) repeating step a.) for a period of time until the animal is acclimatized to the environment of the experiment, the medical or veterinary staff of the experiment, or the settings of the experiment;
   c.) conducting the experiment with the acclimatized animal.

In some embodiments, the experiment to be conducted is an oral glucose tolerance test (OGTT).

In a further embodiment, the animal is a mouse, a rat or a monkey. In an additional embodiment, the animal is a cat or a dog.

In yet another embodiment, the period of time for which the acclimatization process is repeated according to step b.) is at least 2, 3, 4, 5, 6 or 7 days, at least one week, at least two weeks, or at least three weeks or longer. In some embodiments, the acclimatization takes place on a daily basis, i.e., step a.) of the method is performed once per day during the period of time.

In some embodiments, the acclimatization process is monitored by observing stress factors in the animal. In some embodiments, the acclimatization process is monitored by determining the blood glucose values of the animal after each acclimatization step. Acclimatization is achieved when the blood glucose values consistently fall within the same range when the animal is exposed to the environment of the experiment, the medical or veterinary staff of the experiment, or the settings of the experiment. This means that blood glucose levels no longer rise in response to exposure to the environment of the experiment, the medical or veterinary staff of the experiment, or the experimental settings because a stress response is no longer triggered in the animal. In particular, acclimatization is achieved if the blood glucose levels of the animal of interest do not rise above a range of 50 to 85 mg/dl glucose, in some embodiments not above 50 to 75 mg/dl, in further embodiments not above 50 to 65 mg/dl, in even further embodiments not above 53-57 mg/dl after exposure of the animal to the experimental environment, staff, or set up.

In a further embodiment, the animal exposed in step a.) to the medical or veterinary staff is confronted with the identical persons of the staff during each repetition of step a.).

In a further embodiment of the acclimatization process, steps a.) and b.) of the method comprise taking the animal of interest out of its cage for a period of time which is identical to or longer than the amount of time the experiment of interest will take. In some embodiments, the animal of interest is taken out of its cage for 10 minutes, 20 minutes, 30 minutes, one hour, one and a half hours, two hours, three hours, four hours, five hours, six hours or even longer.

In another embodiment, during step a.) of the method, a mock experiment is conducted on the animal so as to acclimatize the animal to the procedures of the experiment. In some embodiments, the animal of interest is put into the respective experimental set up devices. For example, in some experiments it may be necessary to fix the position of the animal of interest. Thus, the animal of interest should be fixed in this position during step a.) as well. Thereby, the animal will get acclimatized to the fixation process and thus suffer from less stress during the experiment. For example, a monkey could be fixed in a chair. For an OGTT example, the animal should be trained with oral tubing as would occur during the experiment. Furthermore, if blood is to be taken from the animal during the experiment of interest, then the animal should be accustomed to this procedure by taking blood from the animal during step a.) of the method.

In an additional embodiment, the animal of interest is regularly touched by the medical or veterinary staff which will conduct the experiment of interest in step c.). In a further embodiment, the staff plays with the animal and thereby accustoms the animal to the staff. In some embodiments, the touching or playing occurs on a daily basis.

In yet a further embodiment, the animal of interest receives the respective diet necessary for the experiment of interest during the acclimatization process.

In an additional embodiment, only an animal which exhibits good weight condition and good general condition after the acclimatization process is used for the experiment of interest in step c.). Animals with poor weight development and poor general condition after the acclimatization process should not be used for the experiment of interest in step c.).

In some embodiments where the experiment is an OGTT, the animal of interest receives free access to food and drink until twelve hours prior to step c.). Thereafter, only access to potation is allowed.

In a further embodiment for an OGTT, the animal receives during step a.) oral tubing and is administered sterile water, a drug, or a food suspension through the tubing.

Those skilled in the art will recognize, or be able to ascertain, using no more than routine experimentation, numerous equivalents to the methods described herein. Such equivalents are considered to be within the scope of this invention.

Although the examples laid out in detail below discuss OGTT experiments, a person skilled in the art will understand that the teaching described herein is not restricted to OGTT, but can be transferred to any other animal experiment in which a stress response of the animal would affect the reliability and accuracy of the experimental results. It is intended that the specification, together with the examples, be considered only exemplary of the scope and spirit of the invention.

The following non-limiting examples further illustrate the methods described herein.

EXAMPLES

Example 1

Acclimatization of Rats for OGTT

The rats were obtained at least one week before the OGTT experiments. The same people performed both the acclimatization process and the rat OGTT experiments. The rats were taken out of their cages every day for at least two hours because the OGTT experiment in this case needs over two hours time. While the rats were outside of their cages, they were touched and played with by humans in order to provide for acclimatization. In addition, the rats were put several times into the cloth covered heating tube which was to be used later for the blood sampling from rat tail vessel during the OGTT. Oral tubing was also inserted to the stomach. Furthermore, the rats received sterile water injections, or in some cases a glucose solution, through the oral tube. After one week of the acclimatization process, rat blood glucose levels no longer reacted to human touch, oral tubing, or blood sampling.

Example 2

OGTT with Rats

For the OGTT after the acclimatization process, acclimatized rats were selected. Rats with poor weight growth or poor general condition were not used in the experiment. The rats were free to take food and water up to 12 hours prior to starting the OGTT experiments. After this cut-off time, the rats only had access to water. In the OGTT experiment, the rats received a supplement solution. Ingredients of the supplement solution, except coenzyme Q10, were purchased from Sigma Aldrich Japan (Tokyo, Japan). A supplement solution was prepared by mixing together one gram of vitamin C, 1.5 grams of glutamic acid, 500 mg of cysteine, 40 mg of riboflavin, 100 mg of succinic acid, 100 mg of fumaric acid, 10 mg of niacin, and 250 mg of AQUAQ10P40 (100 mg of coenzyme Q10). AQUAQ10P40 (Nissin Pharma, Tokyo Japan), which contains 40% by volume of coenzyme Q10, was used as coenzyme Q10. The total weight of one supplement unit was 3500 mg.

Then, a glucose solution was administered via the oral tube. Two different glucose doses, high (250 mg/Kg) and low (100 mg/Kg), were administrated to the stomach of the rats. Blood sampling times were 0, 30, 60, 90, and 120 minutes after glucose administration. The rats were put in the cloth covered heating tube to avoid stimulation and keep from moving during the blood sampling procedure. The tail veins of the rats were cut and at least 0.2 ml of blood were obtained. This gave rise to over 0.1 ml serum. The serum samples, i.e., blood samples, were analyzed commercially for glucose and insulin levels at an animal clinical chemistry laboratory.

Example 3

Acclimatization of Cynomolgus Monkeys for OGTT

Cynomolgus monkeys were obtained at least three weeks before the start of the OGTT experiments. The same people cared for the animals during the acclimatization process and performed the Cynomolgus Monkey OGTT experiments.

For acclimatization, the Cynomolgus monkeys were taken out of their cages for over two hours because the intended OGTT experiments need over two hours time. During these time periods, the Cynomolgus monkeys were mounted to a neck holding seat and in parallel touched by human staff. The staff also played with the monkeys. The Cynomolgus monkeys were also subjected several times to blood sampling from a vein of the lower limb during the acclimatization process. In addition, training of oral tubing and administration of sterile water or glucose solution through said tube was also performed.

After two weeks of acclimatization, the blood glucose levels of the Cynomolgus monkeys no longer reacted to human touch, oral tubing, or blood sampling.

Example 4

OGTT with Cynomolgus Monkeys

After the acclimatization process, acclimatized Cynomolgus monkeys were selected for the OGTT experiments. Monkeys exhibiting poor weight growth or poor general condition were not used in the OGTT experiments. The monkeys had free access to food and water until 12 hours before starting the OGTT experiments. After the time cut-off, the monkeys only had access to water.

The Cynomolgus monkeys were mounted on neck holding seats and oral tubing was inserted. The Cynomolgus monkeys received a supplement solution (as described above in Example 2) through said oral tubing. Afterwards, a glucose solution of 100 mg/Kg body weight was administered to the stomach of the monkeys via the oral tubing. Then, blood sampling was performed by taking 2.0 ml blood samples from the lower limbs of the monkeys. The blood sampling time points were 0, 30, 60, 90, 120, 150, and 180 minutes after glucose administration. In the intervals between the individual blood sampling time points the monkeys were released from the neck holding seat and were put back into their cages to reduce the stress. The blood samples were analysed at an animal clinical chemistry laboratory.

The invention claimed is:

1. A method for enhancing the accuracy, reliability, or reproducibility of an animal experiment, the method comprising:
   a.) exposing an animal to the environment of the experiment, the medical or veterinary staff of the experiment, or the settings of the experiment;
   b.) repeating step a.) for a period of time until the animal is acclimatized to the environment of the experiment, the medical or veterinary staff of the experiment, or the settings of the experiment;
   c.) conducting the experiment with the acclimatized animal, wherein exposing the animal to the settings of the experiment comprises mock conducting the steps of the experiment with the animal, the mock conducting the steps of the experiment comprises taking the animal out of its cage for at least the same period of time as the experiment will take and fixing the animal in the same manner as the animal would be fixed in the experiment.

2. The method according to claim 1, wherein exposing the animal to the environment of the experiment comprises bringing the animal to the same location where the experiment will be conducted in step c.).

3. The method according to claim 1, wherein the animal is taken out of its cage for 10 minutes, 20 minutes, 30 minutes, one hour, one and a half hours, two hours, three hours, four hours, five hours, six hours, or longer.

4. The method according to claim 1, wherein mock conducting the experiment further comprises:
   a.) inserting oral tubing into the animal, or
   b.) taking a blood sample from the animal.

5. The method according to claim 1, wherein the period of time in step b.) is at least 2, 3, 4, 5, 6 or 7 days, one week, two weeks, three weeks, or longer.

6. The method according to claim 5, wherein step a.) is conducted on a daily basis during the time period.

7. The method according to claim 1, wherein at least one stress factor in the blood of the animal is monitored during step b.).

8. The method of claim 7, wherein the stress factor is blood glucose.

9. The method according to claim 8, wherein acclimatization is achieved when the blood glucose level of the animal does not rise above a range of 50 to 85 mg/dl glucose.

10. The method according to claim 9, wherein the blood glucose level of the animal does not rise above 50 to 75 mg/dl.

11. The method according to claim 10, wherein the blood glucose level of the animal does not rise above 50 to 65 mg/dl.

12. The method according to claim 11, wherein the blood glucose level of the animal does not rise above 53-57 mg/dl.

13. The method according to claim 1, wherein the experiment is an OGTT.

14. The method according to claim 1, wherein the animal is a vertebrate.

15. The method of claim 14, wherein the vertebrate is a mouse, a rat, a dog, a cat, or a monkey.

16. The method according to claim 15, wherein the vertebrate is a rat.

17. The method according to claim 15, wherein the vertebrate is a monkey.

18. The method according to claim 13, wherein the OGTT comprises fixing a monkey in a neck holding chair or fixing a rat in a cloth covered heating tube.

19. The method as in claims 13 or 14, wherein mock conducting the steps of the experiment further comprises:
   a.) inserting oral tubing into the animal, or
   b.) taking a blood sample from the animal.

20. The method according to claim 1, wherein the animal is administered sterile water, a drug suspension, or a food suspension through an oral tube during step a.).

21. The method according to claim 1, wherein the animal is only allowed access to water during the twelve hours preceding step c.).

22. The method according to claim 1, wherein only acclimatized animals are selected for step c.).

23. A method for enhancing the accuracy, reliability, or reproducibility of an animal experiment, the method comprising:
   a.) exposing an animal to the environment of the experiment, the medical or veterinary staff of the experiment, or the settings of the experiment;
   b.) repeating step a.) for a period of time until the animal is acclimatized to the environment of the experiment, the medical or veterinary staff of the experiment, or the settings of the experiment;
   c.) conducting the experiment with the acclimatized animal, wherein exposing the animal to the medical or veterinary staff comprises exposing the animal to the same staff that will conduct the experiment in step c.) and touching or playing of the animal by the same staff that will conduct the experiment in step c.).

* * * * *